US008889044B2

(12) United States Patent
Yano et al.

(10) Patent No.: US 8,889,044 B2
(45) Date of Patent: Nov. 18, 2014

(54) METHOD FOR PRODUCING MESOPOROUS SILICA PARTICLES

(75) Inventors: Toshihiro Yano, Wakayama (JP); Masaki Komatsu, Wakayama (JP); Hiroji Hosokawa, Wakayama (JP); Jun Yoshida, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/516,929

(22) PCT Filed: Dec. 14, 2010

(86) PCT No.: PCT/JP2010/072476
§ 371 (c)(1),
(2), (4) Date: Jun. 18, 2012

(87) PCT Pub. No.: WO2011/074573
PCT Pub. Date: Jun. 23, 2011

(65) Prior Publication Data
US 2012/0256336 A1    Oct. 11, 2012

(30) Foreign Application Priority Data

Dec. 18, 2009  (JP) ................................ 2009-287843
Feb. 2, 2010   (JP) ................................ 2010-021413

(51) Int. Cl.
*B01J 13/00* (2006.01)
(Continued)

(52) U.S. Cl.
CPC ............. *C09D 7/005* (2013.01); *C01P 2002/72* (2013.01); *C09D 7/1266* (2013.01);
(Continued)

(58) Field of Classification Search
CPC ............ B01J 13/00; C09D 5/00; B82Y 40/00
See application file for complete search history.

(56) References Cited

U.S. PATENT DOCUMENTS 5,028,360 A     7/1991  Ito et al.
8,048,394 B2 *  11/2011 Yano et al. ................. 423/339
(Continued)

FOREIGN PATENT DOCUMENTS

CN   101528603 A    9/2009
EP   1 502 898 A1   2/2005
(Continued)

OTHER PUBLICATIONS

U.S. Appl. No. 13/529,668, filed, Jun. 21, 2012, Komatsu, et al.
(Continued)

*Primary Examiner* — Randy Gulakowski
*Assistant Examiner* — Jeffrey Washville
(74) *Attorney, Agent, or Firm* — Oblon, Spivak, McClelland, Maier & Neustadt, L.L.P.

(57) ABSTRACT

The present invention relates to a method for producing mesoporous silica particles including a silica-containing outer shell portion with a mesoporous structure. The method includes the steps of: (I) pressurizing a mixed solution containing a hydrophobic organic compound, a surfactant, and an aqueous solvent by a high-pressure emulsification method so as to form an emulsion that includes emulsion droplets containing the hydrophobic organic compound; (II) adding a silica source to the emulsion so as to form a silica-containing outer shell portion with a mesoporous structure on a surface of the emulsion droplets, and precipitating composite silica particles including the outer shell portion and the emulsion droplets on an inner side relative to the outer shell portion; and (III) removing the emulsion droplets from the composite silica particles.

According to the production method of the present invention, it is possible to produce easily mesoporous silica particles that have a small average particle size and include fewer coarse particles. Thus, the mesoporous silica particles produced by this method are useful in fields that handle a paint composition for an antireflection film and a coating film.

20 Claims, 1 Drawing Sheet

(51) Int. Cl.
  C09D 5/00    (2006.01)
  C09D 7/00    (2006.01)
  C09D 7/12    (2006.01)
  C01B 37/02   (2006.01)
  C09C 1/30    (2006.01)
  C01B 33/18   (2006.01)
  B82Y 30/00   (2011.01)
  C08K 7/26    (2006.01)
  C08K 3/36    (2006.01)

(52) U.S. Cl.
  CPC ............. *C01B 37/02* (2013.01); *C01P 2004/64* (2013.01); *C09C 1/3063* (2013.01); *C09D 7/1216* (2013.01); *C01P 2006/16* (2013.01); *C01P 2004/34* (2013.01); *C01B 33/18* (2013.01); *C09D 7/1275* (2013.01); *C01P 2004/62* (2013.01); *C01P 2006/12* (2013.01); *C01P 2002/70* (2013.01); *C08K 7/26* (2013.01); *C01P 2004/84* (2013.01); *B82Y 30/00* (2013.01); *C08K 3/36* (2013.01); *Y10S 977/773* (2013.01); *Y10S 977/89* (2013.01)
  USPC ....... 264/4.6; 106/287.34; 428/220; 977/773; 977/890

(56) References Cited

U.S. PATENT DOCUMENTS

| | | | |
|---|---|---|---|
| 2005/0109238 A1* | 5/2005 | Yamaki et al. | 106/287.16 |
| 2007/0148121 A1 | 6/2007 | Fukui et al. | |
| 2008/0199523 A1 | 8/2008 | Finnie et al. | |
| 2009/0029146 A1 | 1/2009 | Holmes et al. | |
| 2010/0069237 A1 | 3/2010 | Yano et al. | |
| 2012/0045646 A1 | 2/2012 | Yano et al. | |

FOREIGN PATENT DOCUMENTS

| | | |
|---|---|---|
| EP | 2 078 696 A1 | 7/2009 |
| JP | 2006 102592 | 4/2006 |
| JP | 2007 119765 | 5/2007 |
| JP | 2007 182341 | 7/2007 |
| JP | 2008 110905 | 5/2008 |
| JP | 2008 150229 | 7/2008 |
| JP | 2008-150229 A | 7/2008 |
| JP | 2008 535756 | 9/2008 |
| JP | 2008-285356 | 11/2008 |
| JP | 2009-203115 | 9/2009 |
| JP | 2009-203116 | 9/2009 |
| JP | 2009 203285 | 9/2009 |
| WO | 2008/053695 | 5/2008 |

OTHER PUBLICATIONS

International Search Report Issued Feb. 15, 2011 in PCT/JP10/72476 Filed Dec. 14, 2010.

Extended European Search Report issued Aug. 6, 2013 in Patent Application No. 10837599.9.

Jiawei Wang, et al, "Synthesis of mesoporous silica hollow spheres in supercritical CO2/water systems" Journal of Materials Chemistry, vol. 16, No. 18, XP055071656, Mar. 14, 2006, pp. 1751-1756.

International Search Report issued Feb. 8, 2011, PCT/JP2010/072257 filed Dec. 10, 2010.

Rohit Kumar Rana et al., "Acoustic Cavitation Leading to the Morphosynthesis of Mesoporous Silica Vesicles", Advanced Materials, Oct. 2, 2002, 14, No. 19, pp. 1414-1418.

Schuth et al., Oil-Water Interface Templating of Mesoporous Macroscale Structures, Science Aug. 9, 1996, vol. 273, pp. 768-771.

Office Action issued Feb. 27, 2014 in Japanese Patent Application No. 2009-289579.

* cited by examiner

METHOD FOR PRODUCING MESOPOROUS SILICA PARTICLES

CROSS REFERENCES TO RELATED APPLICATIONS

This application is a 371 of International Patent Application No. PCT/JP10/072,476, filed on Dec. 14, 2010, and claims priority to Japanese Patent Application No. 2009-287843, filed on Dec. 18, 2009, and Japanese Patent Application No. 2010-021413, filed on Feb. 2, 2010.

TECHNICAL FIELD

The present invention relates to a method for producing mesoporous silica particles, a paint composition containing the mesoporous silica particles, and a coating film and an antireflection film to be formed using the paint composition.

BACKGROUND ART

Porous materials, which have a large surface area, have been used widely as a catalyst support and a support for the dispersion and retention of an enzyme, a functional organic compound, or the like. Above all, a porous material having a sharp pore size distribution of pores forming a porous structure has a molecular sieve function, and thus can be applied to a material separation agent and the like. In recent years, as a porous material having uniform and fine pores, mesoporous silica having pores with a meso-scale diameter has been developed and attracting attention as a material to be applied to a controlled release material, an electronic material, an optical material, and the like as well as a material separation agent, a catalyst support, and the like.

Mesoporous silica can have various morphologies, such as a spherical shape, a fiber shape, a film shape, and a particle shape that includes a silica-containing outer shell portion with a mesoporous structure and a hollow portion present on an inner side relative to the outer shell portion (hollow mesoporous silica particles).

Patent Document 1 discloses a method for producing hollow mesoporous silica particles having an average primary particle size of 0.05 to 10 μm and an average pore size of 1 to 10 nm. According to this production method, a mixed solution containing a surfactant, a hydrophobic organic compound, and a silica source that yields a silanol compound by hydrolysis is stirred, resulting in oil droplets containing the hydrophobic organic compound with a silica-containing mesoporous layer formed around the oil droplets. Then, the oil droplets are removed from composite silica particles that contain the mesoporous layer and the oil droplets embedded inside the mesoporous layer, thereby obtaining hollow mesoporous silica particles.

PRIOR ART DOCUMENT

Patent Document

Patent Document 1: JP 2008-150229A

DISCLOSURE OF INVENTION

Problem to be Solved by the Invention

However, it was found that with the production method described in Patent Document 1, it is not easy to produce mesoporous silica particles such as hollow mesoporous silica particles that have a small average primary particle size and include fewer coarse particles.

The present invention provides a method for producing easily mesoporous silica particles that have a small average primary particle size and include fewer coarse particles such that, for example, the average primary particle size is 0.2 μm or less and the ratio of particles having a particle size of more than 0.2 μm is 10% or less, a paint composition containing the mesoporous silica particles, and a coating film and an antireflection film to be formed using the paint composition.

Means for Solving Problem

A method for producing mesoporous silica particles according to the present invention is a method for producing mesoporous silica particles including a silica-containing outer shell portion with a mesoporous structure. The method includes the steps of: (I) pressurizing a mixed solution containing a hydrophobic organic compound, a surfactant, and an aqueous solvent by a high-pressure emulsification method so as to form an emulsion that includes emulsion droplets containing the hydrophobic organic compound; (II) adding a silica source to the emulsion so as to form a silica-containing outer shell portion with a mesoporous structure on a surface of the emulsion droplets, and precipitating composite silica particles including the outer shell portion and the emulsion droplets on an inner side relative to the outer shell portion; and (III) removing the emulsion droplets from the composite silica particles.

A paint composition according to the present invention includes: a matrix forming material; and mesoporous silica particles having an average primary particle size of 10 to 200 nm (0.01 to 0.2 μm) that are produced by the method for producing mesoporous silica particles according to the present invention.

A coating film according to the present invention is formed using the paint composition according to the present invention.

An antireflection film according to the present invention includes the coating film according to the present invention.

Effects of the Invention

According to the present invention, it is possible to provide easily mesoporous silica particles that have a small average primary particle size and include fewer coarse particles such that, for example, the average primary particle size is 0.2 μm or less and the ratio of particles having a particle size of more than 0.2 μm is 10% or less. With the mesoporous silica particles of the present invention, it is possible to provide a paint composition that can form a coating film having a low refractive index and a low reflectance, and a coating film and an antireflection film to be formed using the same.

DESCRIPTION OF THE INVENTION

The term "mesoporous structure" as used herein refers to a structure in which a plurality of pores having a pore size of 1 to 10 nm are arranged regularly. The pores penetrate an outer shell portion so that the outside and a hollow portion of a particle communicate with each other. The mesoporous structure is formed by, for example, self assembly of silica that takes place by mixing a cationic surfactant and a silica source.

The term "mesoporous silica particles" as used herein refers to particles that include an outer shell portion with the mesoporous structure and a hollow portion present on an inner side relative to outer shell portion. The term "hollow mesoporous silica particles" refers to particles that include an outer shell portion with the mesoporous structure and a hollow portion present on an inner side relative to the outer shell portion with gas such as air present in the hollow portion and pores. In the case where the "mesoporous silica particles" are dispersed in an organic solvent, the hollow portion and the pores of the mesoporous silica particles may be filled with the organic solvent. Although the "mesoporous silica particles" are obtained by removing emulsion droplets from "composite silica particles" whose hollow portion is filled with a hydrophobic organic compound (emulsion droplets), a small amount of the hydrophobic organic compound may be left unremoved in the hollow portion and the pores of the mesoporous silica particles.

The inventors of the present application have found that with the production method described in Patent Document 1, it is not easy to produce mesoporous silica particles that have a small average primary particle size and include fewer coarse particles as described above. Further, it was found that the reason for this is that it is not easy to form emulsion droplets having a small average primary particle size and a narrow particle size distribution by stirring the mixed solution.

The present invention is based on the finding that in a method for producing mesoporous silica particles including a silica-containing outer shell portion with a mesoporous structure, the use of a high-pressure emulsification method, instead of the stirring process, can facilitate the formation of emulsion droplets having a small average primary particle size and a narrow particle size distribution.

[Method for Producing Mesoporous Silica Particles (1)]

Next, an example of a method for producing mesoporous silica particles according to the present invention (hereinafter, this may be referred to as a "production method of the present invention") will be described. According to this production method, mesoporous silica particles having an average pore size of 1 to 3 nm and an average primary particle size of 0.005 to 0.2 μm, for example, can be produced easily. The mesoporous silica particles obtained by this production method are mesoporous silica particles that include an outer shell portion with a mesoporous structure and a hollow portion present on an inner side relative to the outer shell portion with air present in the hollow portion and pores, i.e., "hollow mesoporous silica particles".

[Process (I): Preparation of Mixed Solution]

In an example of the production method of the present invention, initially, a mixed solution containing a hydrophobic organic compound, a surfactant, and an aqueous medium is prepared.

The mixed solution can be prepared by, for example, adding the hydrophobic organic compound and the surfactant to the aqueous medium. The hydrophobic organic compound and the surfactant may be added in this order or simultaneously. Further, the aqueous medium may be stirred while or after the hydrophobic organic compound and/or the surfactant is added.

The stirring time varies depending on the type of an agitator to be used or the like, and is preferably 1 minute or more, more preferably 2 minutes or more, and further preferably 5 minutes or more after the whole is mixed uniformly.

The type of an agitator to be used for the stirring is not limited particularly. Examples of the agitator include a pencil mixer, a homomixer, a homogenizer, an ultrasonic disperser, and the like. A commercially available agitator, such as DISPER (manufactured by PRIMIX Corporation), CLEARMIX (manufactured by M Technique Co., Ltd.), and CAVITRON (manufactured by Pacific Machinery & Engineering Co., Ltd.), can be used.

The temperature of the mixed solution during the stirring is kept preferably at 0° C. to 90° C. and more preferably at 10° C. to 50° C. from the viewpoint of preventing the evaporation of the aqueous medium to suppress variations in the concentrations of the hydrophobic organic compound and the surfactant in the mixed solution.

(Hydrophobic Organic Compound)

The hydrophobic organic compound refers to a compound that has a low degree of solubility in water and is phase-separated from water. The hydrophobic organic compound is preferably dispersible in the presence of the surfactant and preferably dispersible in the presence of a quaternary ammonium salt as an example of the surfactant.

In the case where water is used as an aqueous solvent, the hydrophobic organic compound is in a liquid state at temperatures ranging preferably from 0° C. to 100° C. and more preferably from 20° C. to 90° C.

The hydrophobic organic compound has a Log $P_{ow}$ of preferably 1 or more and more preferably 2 to 25. Herein, "Log $P_{ow}$" refers to a 1-octanol/water partition coefficient of a chemical substance calculated by the log $K_{ow}$ method. More specifically, a Log $P_{ow}$ value is obtained by fragmenting the chemical structure of a compound into its components, and accumulating hydrophobic fragment constants of respective fragments (see Meylan, W. M. and P. H. Howard. 1995. Atom/fragment contribution method for estimating octanol-water partition coefficients. J. Pharm. Sci. 84: 83-92).

Examples of the hydrophobic organic compound include a hydrocarbon compound, an ester compound, a fatty acid having a carbon number of 6 to 22, and an oil solution such as silicone oil.

Examples of the hydrocarbon compound include an alkane having a carbon number of 5 to 18, a cycloalkane having a carbon number of 5 to 18, liquid paraffin, liquid petroleum jelly, squalane, squalene, perhydrosqualene, trimethylbenzene, xylene, benzene, and the like. Among them, an alkane having a carbon number of 5 to 18 and a cycloalkane having a carbon number of 5 to 18 are preferable.

Examples of the ester compound include oils and fats such as glycerol esters of fatty acids having a carbon number of 6 to 22. Specific examples thereof include trilaurin, triolein, tripalmitin, tristearin, mink oil, turtle oil, soybean oil, sweet almond oil, beauty-leaf oil, palm oil, grape seed oil, sesame seed oil, corn oil, parleam oil, alala oil, rapeseed oil, sunflower oil, cottonseed oil, apricot oil, castor oil, avocado oil, jojoba oil, olive oil, cereal germ oil, and the like.

Examples of the ester compound further include a condensate of a fatty acid having a carbon number of 4 to 22 and a monohydric alcohol or polyhydric alcohol other than glycerol having a carbon number of 1 to 22. Specific examples thereof include isopropyl myristate, isopropyl palmitate, butyl stearate, hexyl laurate, isononyl isononate, 2-ethylhexyl palmitate, 2-hexyldecyl laurate, 2-octyldecyl palmitate, 2-octyldodecyl myristate, and the like. Other examples of the ester compound include an ester of a polyvalent carboxylic acid compound and an alcohol. Specific examples thereof include diisopropyl adipate, 2-octyldodecyl lactate, 2-diethylhexyl succinate, diisostearyl malate, glyceryl triisostearate, diglyceryl triisostearate, and the like.

Examples of the fatty acid having a carbon number of 6 to 22 include capric acid, lauric acid, myristic acid, palmitic acid, stearic acid, behenic acid, oleic acid, linoleic acid, linolenic acid, isostearic acid, and the like.

Examples of the silicone oil include polydimethylsiloxane (PDMS), polysiloxane modified with a fatty acid, an aliphatic alcohol, or polyoxyalkylene, fluorosilicone, perfluorosilicone oil, and the like.

Polydimethylsiloxane (PDMS) may be a phenylated product, such as phenyl trimethicone, or may be optionally substituted with an aliphatic group and/or an aromatic group. For the reason of a high utilization ratio, it is hydrocarbon-based oil or silicone oil, preferably linear or cyclic silicone that optionally includes an alkyl group or an alkoxy group that is pendant from or at the end of a silicone chain and contains 2 to 7 silicon atoms, and particularly preferably octamethylcyclotetrasiloxane, decamethylcyclopentasiloxane, hexadecamethylcyclohexasiloxane, heptamethylhexyltrisiloxane, heptamethyloctyltrisiloxane, or the like. The utilization ratio as mentioned above refers to a ratio of the amount of the hydrophobic organic compound contained in and inside the outer shell portion to the amount of the hydrophobic organic compound used for the preparation of the mixed solution.

These hydrophobic organic compounds may be used alone or in combination of two or more at any ratio.

Among the above-described hydrophobic organic compounds, an alkane having a carbon number of 5 to 18 and a cycloalkane having a carbon number of 5 to 18 are preferable for the reasons that they are emulsified easily with at least one surfactant selected from quaternary ammonium salts represented by general formulae (1) and (2) described later and ensure a high utilization ratio.

The content of the hydrophobic organic compound in the mixed solution is preferably 0.1 to 100 mM/L, more preferably 1 to 100 mM/L, and further preferably 5 to 80 mM/L from the viewpoint of improving the utilization ratio of the hydrophobic organic compound.

(Aqueous Solvent)

The aqueous solvent to be used in an example of the production method of the present invention may be, for example, water, a mixed solvent of water and a water-soluble organic solvent, or the like, but preferably is composed only of water in view of the stability of emulsion droplets. Examples of the water include distilled water, ion exchanged water, ultrapure water, and the like. Examples of the water-soluble organic solvent include methanol, ethanol, acetone, 1-propanol, 2-propanol, and the like. In the case where the aqueous solvent contains the water-soluble organic solvent, the content of the water-soluble organic solvent in the aqueous solvent is preferably 0.1 to 50 weight %, more preferably 1 to 40 weight %, and further preferably 1 to 30 weight % from the viewpoint of the stability of the emulsion droplets.

(Surfactant)

The surfactant to be used in an example of the production method of the present invention is preferably at least one surfactant selected from the quaternary ammonium salts represented by the following general formulae (1) and (2) from the viewpoint of improving the utilization ratio of the hydrophobic organic compound.

$$[R^1(CH_3)_3N]^+X^- \qquad (1)$$

$$[R^1R^2(CH_3)_2N]^+X^- \qquad (2)$$

where $R^1$ and $R^2$ each independently represent a linear or branched alkyl group having a carbon number of 4 to 22, and $X^-$ represents a monovalent anion.

In the above-described general formulae (1) and (2), $R^1$ and $R^2$ are each independently a linear or branched alkyl group having a carbon number of preferably 6 to 18 and further preferably 8 to 16 from the viewpoint of improving the utilization ratio of the hydrophobic organic compound. Examples of the alkyl group having a carbon number of 4 to 22 include various butyl groups, various pentyl groups, various hexyl groups, various heptyl groups, various octyl groups, various nonyl groups, various decyl groups, various dodecyl groups, various tetradecyl groups, various hexadecyl groups, various octadecyl groups, various eicosyl groups, and the like.

In the above-described general formulae (1) and (2), $X^-$ is preferably a monovalent anion such as a halogen ion, a hydroxide ion, and an nitroxide ion. $X^-$ is more preferably a halogen ion, further preferably a chlorine ion or a bromine ion, and still further preferably a chlorine ion.

Examples of alkyltrimethylammonium salts represented by the general formula (1) include butyltrimethylammonium chloride, hexyltrimethylammonium chloride, octyltrimethylammonium chloride, decyltrimethylammonium chloride, dodecyltrimethylammonium chloride, tetradecyltrimethylammonium chloride, hexadecyltrimethylammonium chloride, stearyltrimethylammonium chloride, butyltrimethylammonium bromide, hexyltrimethylammonium bromide, octyltrimethylammonium bromide, decyltrimethylammonium bromide, dodecyltrimethylammonium bromide, tetradecyltrimethylammonium bromide, hexadecyltrimethylammonium bromide, stearyltrimethylammonium bromide, and the like.

Examples of dialkyl dimethylammonium salts represented by the general formula (2) include dibutyldimethylammonium chloride, dihexyldimethylammonium chloride, dioctyldimethylammonium chloride, dihexyldimethylammonium bromide, dioctyldimethylammonium bromide, didodecyldimethylammonium bromide, ditetradecyldimethylammonium bromide, and the like.

Among the above-described quaternary ammonium salts, in particular, alkyltrimethylammonium salts represented by the general formula (1) are preferable, and alkyltrimethylammonium bromide or alkyltrimethylammonium chloride is more preferable from the viewpoint of forming ordered mesopores.

These surfactants may be used alone or in combination of two or more at any ratio.

The content of the surfactant in the mixed solution may be adjusted appropriately according to, for example, the surface area of the emulsion droplets in an emulsion to be obtained by pressurizing the mixed solution by a high-pressure emulsification method, and is preferably 0.1 to 100 mM/L, more preferably 0.2 to 80 mM/L, and further preferably 0.5 to 70 mM/L from the viewpoint of improving the yield and dispersibility of the mesoporous silica particles and obtaining the mesoporous silica particles having a narrow particle size distribution.

In the case where the emulsion droplets have an average primary particle size of 0.004 to 0.15 μm and the mesoporous silica particles to be formed with the emulsion droplets as a nucleus have an average primary particle size of 0.005 to 0.2 μm, the content of the surfactant in the mixed solution is preferably 0.1 to 100 mM/L, more preferably 0.2 to 80 mM/L, and further preferably 0.5 to 70 mM/L from the viewpoint of improving the yield and dispersibility of the mesoporous silica particles.

[Process (I): Preparation of Emulsion Including Emulsion Droplets]

In an example of the production method of the present invention, the mixed solution prepared as described above is pressurized by a high-pressure emulsification method, resulting in the formation of the emulsion that includes the emulsion droplets containing the hydrophobic organic compound.

The emulsion droplets have an average primary particle size of preferably 0.004 to 0.15 µm, more preferably 0.005 to 0.15 µm, still more preferably 0.005 to 0.13 µm, even more preferably 0.007 to 0.12 µm, further preferably 0.01 to 0.1 µm, and still further preferably 0.03 to 0.06 µm from the viewpoint of forming the mesoporous silica particles having a small average primary particle size and a narrow particle size distribution. When the average primary particle size of the emulsion droplets falls within the above-described range, it is possible to form easily the mesoporous silica particles whose average primary particle size is shorter than the wavelength of visible light, such as the mesoporous silica particles having an average primary particle size of 0.005 to 0.2 µm and an average pore size of 1 to 3 nm or the mesoporous silica particles having an average primary particle size of 0.01 to 0.2 µm and an average pore size of 1.0 to 2.5 nm. Thus, the mesoporous silica particles having a small particle size and a high porosity that are produced by an example of the production method of the present invention can be used suitably as a low refractive index material for use in an optical film such as a low refractive index film.

The average primary particle size of the emulsion droplets can be inferred from the diameter of a hollow portion of the mesoporous silica particles to be produced by an example of the production method of the present invention. More specifically, the mesoporous silica obtained by the production method of the present invention is dried and calcined, or alternatively, the mesoporous silica is dried and has the organic solvent or the like filled in pores and inside the outer shell portion removed. Then, the resultant mesoporous silica is observed with a transmission electron microscope. A hollow portion diameter (an inner diameter of the outer shell portion) of each of the whole particles (100 to 150) in five fields of view, each including 20 to 30 particles, is measured based on a photograph, followed by calculating a number average value, thereby obtaining the average primary particle size of the emulsion droplets.

The high-pressure emulsification of the mixed solution is performed at a high-pressure dispersion portion of a high-pressure emulsification dispersion device, for example. The high-pressure dispersion portion includes a narrow flow path. When the mixed solution is forced into the high-pressure dispersion portion at a predetermined pressure and passes through the flow path, a shearing force or the like is applied to the mixed solution, so that the mixed solution turns into the emulsion including the emulsion droplets.

The cross-sectional shape of the flow path is not limited particularly as long as the mixed solution can be pressurized at a predetermined pressure. In the case where the flow path has a circular cross-sectional shape, the diameter thereof is preferably 20 to 200 µm and more preferably 50 to 100 µm, for example.

The high-pressure emulsification dispersion device that can be used is not limited particularly, and is preferably Microfluidizer (M-110EHi manufactured by Microfluidics Corporation), Star Burst (manufactured by SUGINO MACHINE LIMITED), Nanomizer (manufactured by Yoshida Kikai co., ltd.), or the like from the viewpoint of ease of operation.

The high-pressure dispersion portion may be of either a counter collision type or a penetration type. The counter collision type has a structure in which, for example, the flow path is branched into a plurality of paths in midstream, so that fluids flowing through the respective branched paths are allowed to collide with each other at a portion where the branched paths converge again. The penetration type has a structure in which, for example, a plurality of through holes having a uniform diameter are accumulated.

When the mixed solution is subjected to the high-pressure emulsification, the pressure to be applied to the mixed solution is preferably 20 to 250 MPa, more preferably 30 to 220 MPa, and further preferably 40 to 200 MPa from the viewpoint of forming the emulsion droplets having a small average primary particle size and a narrow particle size distribution. By adjusting the pressure to be applied to the mixed solution, it is possible to form the emulsion droplets having a desired average primary particle size and a narrow particle size distribution. This pressure can be confirmed on a pressure display portion provided in the high-pressure emulsification dispersion device.

The number of times the high-pressure emulsification treatment is performed may be selected appropriately according to the above-described pressure, a desired average primary particle size of the emulsion droplets, or the like, and is preferably 1 to 10 and more preferably 1 to 5.

[Process (II): Formation of Silica-Containing Outer Shell Portion with Mesoporous Structure]

In an example of the production method of the present invention, a silica source is added to the emulsion prepared as described above so as to form a silica-containing outer shell portion with a mesoporous structure on a surface of the emulsion droplets, and composite silica particles including the outer shell portion and the hydrophobic organic compound (emulsion droplets) present on an inner side relative to the outer shell portion are precipitated.

The silica source may be added to the emulsion as it is, or alternatively, a silica source-containing solution obtained by adding the silica source to a predetermined solvent may be added to the emulsion. Examples of this solvent include water-soluble organic solvents such as methanol, ethanol, acetone, propanol, and isopropanol, and methanol is preferable. The water-soluble organic solvent preferably is dehydrated.

(Silica Source)

The silica source is preferably one that yields a silanol compound by hydrolysis, and specific examples thereof include compounds represented by the following general formulae (3) to (7).

$$SiY_4 \tag{3}$$

$$R^3SiY_3 \tag{4}$$

$$R^3{}_2SiY_2 \tag{5}$$

$$R^3{}_3SiY \tag{6}$$

$$Y_3Si{-}R^4{-}SiY_3 \tag{7}$$

In the formulae, $R^3$ each independently represents an organic group in which a carbon atom is bonded directly to a silicon atom, $R^4$ represents a hydrocarbon group having 1 to 4 carbon atoms or a phenylene group, and Y represents a monovalent hydrolyzable group that turns into a hydroxy group by hydrolysis.

In the general formulae (3) to (7), $R^3$ is more preferably each independently a hydrocarbon group having a carbon number of 1 to 22 in which a part of hydrogen atoms may be substituted with a fluorine atom, and more specifically an alkyl group having a carbon number of 1 to 22, preferably 4 to 18, more preferably 6 to 18, and particularly preferably 8 to 16, a phenyl group, or a benzyl group, $R^4$ is an alkanediyl group (such as a methylene group, an ethylene group, a trimethylene group, a propane-1,2-diyl group, and a tetramethylene group) having a carbon number of 1 to 4 or a phenylene group, and Y is an alkoxy group having a carbon number of 1 to 22, more preferably 1 to 8, and particularly preferably 1 to 4 or a halogen group other than fluorine.

Preferable examples of the silica source include the following compounds.

A silane compound in which in the general formula (3), Y is an alkoxy group having a carbon number of 1 to 3 or a halogen group other than fluorine.

Trialkoxysilane or dialkoxysilane in which in the general formula (4) or (5), $R^3$ is a phenyl group, a benzyl group, or a hydrocarbon group in which a part of hydrogen atoms is substituted with a fluorine atom having a carbon number of 1 to 20, preferably 1 to 10, and more preferably 1 to 5.

A compound in which in the general formula (7), Y is a methoxy group, and $R^4$ is a methylene group, an ethylene group, or a phenylene group.

Among these compounds, tetramethoxysilane, tetraethoxysilane, phenyltriethoxysilane, and 1,1,1-trifluoropropyltriethoxysilane are preferable, and tetramethoxysilane is more preferable. These silica sources may be used alone or in combination of two or more at any ratio.

The silica source may be added to the emulsion all at once or continuously or intermittently. In order to prevent the agglomeration of the respective particles to be produced, it is preferable to continue to stir the emulsion until the reaction of the silica source is completed and to continue to stir the emulsion for a predetermined period of time (e.g., 0.01 to 24 hours at 10° C. to 80° C.) even after the addition of the silica source has been completed.

It is desirable that the rate of adding the silica source to the emulsion is adjusted appropriately in consideration of the capacity of a reaction system, the type of the silica source, the rate of increase of the concentration of the silica source to be added to the emulsion, and the like.

The temperature of the emulsion during the addition of the silica source is preferably 10° C. to 90° C. and more preferably 10° C. to 80° C. from the viewpoint of ensuring the stability of the emulsion droplets and suppressing variations in the concentrations of the hydrophobic organic compound and the surfactant in the mixed solution.

The pH of the emulsion during the addition of the silica source is adjusted to preferably 8.5 to 12.0 and more preferably 9.0 to 11.5 from the viewpoint of efficient hydrolysis and dehydration condensation of the silica source. Preferably, the pH of the emulsion is adjusted using, for example, sodium hydroxide, ammonia, tetraallyl ammonium hydroxide such as tetramethyl ammonium hydroxide, or the like. Preferably, this pH adjuster is added to the mixed solution during the preparation of the mixed solution containing the surfactant, the hydrophobic organic compound, and the aqueous solvent. The pH of the mixed solution is preferably 8.5 to 12.0, more preferably 9.0 to 11.5, and further preferably 9.5 to 11.5.

By controlling the amount of the silica source to be added, the thickness of the outer shell portion of the mesoporous silica particles can be controlled. The amount of the silica source to be added is preferably 0.1 to 10 weight % and more preferably 0.1 to 2 weight % as a concentration in terms of $SiO_2$ weight in a dispersion solution obtained by adding the silica source to the emulsion (a composite silica particle-containing dispersion solution) from the viewpoint of ensuring production efficiency and improving the dispersibility of the composite silica particles to be obtained.

[Process (III): Removal of Hydrophobic Organic Compound (Emulsion Droplets)]

In an example of the production method of the present invention, for example, the composite silica particles, after being separated from a dispersion medium, are dried and then calcined using an electric furnace or the like, thereby removing the surfactant and the hydrophobic organic compound in the composite silica particles. In an example of the production method of the present invention, before the calcination, the composite silica particles separated from the dispersion medium may be subjected to at least one treatment selected from the group consisting of contact with an acidic solution, washing, and drying according to need. If the composite silica particles are brought into contact with an acidic solution, the surfactant such as a quaternary ammonium salt in the mesopores of the composite silica particles can be reduced or removed efficiently.

From the viewpoint of removing the surfactant and the hydrophobic organic compound reliably and improving the strength of the mesoporous structure, the calcination temperature is preferably 350° C. to 800° C. and more preferably 450° C. to 700° C., and the calcination time is preferably 1 to 10 hours.

Examples of a separation method include a filtration method, a centrifugal separation method, and the like. After being separated by one of these methods, the composite silica particles are subjected to a drying treatment before the calcination using a drier whose internal temperature is preferably 50° C. to 150° C. and more preferably 80° C. to 120° C. from the viewpoint of suppressing carbonization of an organic substance adhered to the composite silica particles.

Examples of the acidic solution include inorganic acids such as hydrochloric acid, nitric acid, and sulfuric acid; organic acids such as acetic acid and citric acid; and a solution obtained by adding a cation exchange resin or the like to water, ethanol, or the like, and hydrochloric acid is particularly preferable. The pH of the acidic solution is preferably 1.5 to 5.0.

[Method for Producing Mesoporous Silica Particles (2)]

Next, another example of the method for producing the mesoporous silica particles according to the present invention will be described. The hollow portion of the mesoporous silica particles to be obtained by this production method is filled with the organic solvent.

In the another example of the method for producing the mesoporous silica particles according to the present invention, the same treatment is performed as in the above-described [Method for producing mesoporous silica particles (1)] from the [Process (I): Preparation of mixed solution] to the [Process (II): Formation of silica-containing outer shell portion with mesoporous structure], but the removal of the surfactant and the emulsion droplets (hydrophobic organic compound) inside the outer shell portion (Process (III)) is performed in the following manner.

In the another example of the production method of the present invention, a cation exchange resin is added to the composite silica particle-containing dispersion solution obtained as described above, so that the composite silica particles in the composite silica particle-containing dispersion solution and the cation exchange resin come into contact with each other while being stirred, thereby allowing the surfactant to be adsorbed to the cation exchange resin. After the stirring, the cation exchange resin is removed by decantation, filtration, or the like, resulting in a mesoporous silica particle aqueous dispersion solution. It is inferred that the emulsion droplets (hydrophobic organic compound) inside the outer shell portion also are removed as the surfactant is removed. It is inferred that following the removal of the emulsion droplets, the aqueous solvent enters into the outer shell portion of the mesoporous silica particles through the pores. The removal of the hydrophobic organic compound can be confirmed based on, for example, whether an endothermic peak derived from the hydrophobic organic compound has disappeared in a thermogravimetric analysis. The thermogravimetric analysis is performed on the dried mesoporous silica particles.

The cation exchange resin is not limited particularly, and a commercially available cation exchange resin can be used. From the viewpoint of improving the removal efficiency of the surfactant in the composite silica particle-containing dispersion solution, a strongly acidic cation exchange resin is preferable, and, for example, Amberlite IR120B (H⁺ form) manufactured by ORGANO CORPORATION, or the like can be used.

The contact treatment for the composite silica particles and the cation exchange resin can be performed by a usual method such as a batch method and a column method. The treatment temperature and the treatment time (stirring time) in a contact treatment system may be determined appropriately so as to provide a desired weight ratio between an organic component and $SiO_2$ (weight of organic component/weight of $SiO_2$) in the hollow mesoporous silica particles as described later. However, from the viewpoint of the ease of producing the mesoporous silica particles of the present invention, the treatment temperature is preferably 10° C. to 80° C. and more preferably 20° C. to 40° C., and the treatment time is preferably 0.1 to 24 hours, more preferably 0.5 to 10 hours, and further preferably 2 to 6 hours. The organic component can be obtained by a usual method such as a thermogravimetric analysis using a differential thermal balance as described in examples.

The amount of the cation exchange resin to be used in a batch method can be determined appropriately so as to provide a desired weight ratio (weight of organic component/weight of $SiO_2$) as described above, and is preferably 1 to 20 equivalent weight and more preferably 5 to 15 equivalent weight with respect to 1 equivalent weight of an organic cation such as the surfactant in the composite silica particle-containing dispersion solution from the viewpoint of the ease of producing the mesoporous silica particles of the present invention.

The composite silica particle-containing dispersion solution may be treated in direct contact with the cation exchange resin. However, from the viewpoint of suppressing adverse effects from the removal of the surfactant, i.e., the aggregation, precipitation, gelation, and the like of the composite silica particles in the composite silica particle-containing dispersion solution, and dispersing the composite silica particles stably, the composite silica particle-containing dispersion solution, before coming into contact with the cation exchange resin, may be mixed with organic silane, so that an organic group is bonded to a surface of the composite silica particles.

The organic silane can be mixed with the composite silica particle-containing dispersion solution by, for example, mixing an organic silane-containing acidic solution into the composite silica particle-containing dispersion solution. The organic silane-containing acidic solution contains, for example, an aqueous solvent and a pH adjuster in addition to the organic silane.

The organic silane is preferably hydrolyzable organic silane having an organic group such as alkoxysilane, disiloxane, and chlorosilane, and disiloxane is more preferable. The organic silane can be used alone or in combination of two or more.

Disiloxane is preferably any of compounds represented by the following general formula (8).

$$R^5_3SiOSiR^6_3 \quad (8)$$

where $R^5$ and $R^6$ each independently represent a hydrogen atom, a halogen atom, an alkyl group, an allyl group, an aryl group, or an alkoxy group, and a plurality of $R^5$ and $R^6$ may be identical or different.

Among the compounds represented by the above-described general formula (8), hexaalkyldisiloxane having an alkyl group with a carbon number of 1 to 3 is preferable, and hexamethyldisiloxane [$(CH_3)_3SiOSi(CH_3)_3$] is particularly preferable.

The aqueous solvent to be contained in the organic silane-containing acidic solution is preferably a mixed solvent of water and a water-soluble organic solvent, more preferably an alcohol aqueous solution, and further preferably a methanol aqueous solution, an ethanol aqueous solution, or a 2-propanol aqueous solution from the viewpoint of improving the reactivity between the organic silane and the composite silica particles.

The pH adjuster to be contained in the organic silane-containing acidic solution is preferably a strong acid, more preferably an inorganic acid, and further preferably hydrochloric acid or nitric acid from the viewpoint of improving the reactivity between the organic silane and the composite silica particles and reducing the refractive index and reflectance of a coating film described later.

The pH of the composite silica particle-containing dispersion solution mixed with the organic silane-containing acidic solution is preferably 1.0 to 7.0, more preferably 1.5 to 4.0, and further preferably 1.7 to 3.0 from the viewpoint of improving the reactivity between the organic silane and the composite silica particles.

Next, the composite silica particle-containing dispersion solution after being subjected to the contact treatment with the cation exchange resin is diluted with an organic solvent, followed by concentration. This dilution-concentration process is repeated several times. The dilution-concentration process is performed so as to substitute the aqueous solvent or the like filled inside the outer shell portion and in the pores of the mesoporous silica particles with the organic solvent. In the case where the surfactant and/or the hydrophobic organic compound left unremoved by the contact treatment with the cation exchange resin is present inside the outer shell portion and the pores of the mesoporous silica particles, the dilution-concentration process helps to reduce the amount of the residual surfactant and/or the amount of the residual hydrophobic organic compound. With an organic solvent in which the hydrophobic organic compound is soluble, the residual hydrophobic organic compound can be removed more effectively.

As the organic solvent, the following [Organic solvent] that can be volatilized easily by the application of heat can be used.

[Organic Solvent]

The organic solvent is not limited particularly as long as it can be volatilized easily by the application of heat, and examples thereof include alcohols, ketones, aromatic hydrocarbons, glycols, glycol ethers, and the like. Examples of the alcohols include 2-propanol, methanol, ethanol, and the like. Examples of the ketones include acetone, methyl ethyl ketone, and the like. Examples of the aromatic hydrocarbons include benzene, toluene, and the like. Examples of the glycols include ethylene glycol, propylene glycol, and the like. Examples of the glycol ethers include ethyl cellosolve, butyl cellosolve, ethyl carbitol, butyl carbitol, and the like. These solvents can be used alone or in combination of two or more. The organic solvent is preferably alcohols and more preferably 2-propanol from the viewpoint of the preservation stability of a paint composition, cost reduction, and ease of production as well as the viewpoint of reducing the refractive index and reflectance of the coating film and improving the strength of the coating film.

The dilution ratio is preferably 1.5 to 100 times, more preferably 2 to 50 times, and further preferably 2 to 10 times from the viewpoint of enhancing ease of production. The concentration factor is preferably 1.5 to 100 times, more preferably 2 to 50 times, and further preferably 2 to 10 times from the viewpoint of the preservation stability of a mesoporous silica particle-containing dispersion solution. The number of times the dilution-concentration process is repeated is preferably 1 to 20, more preferably 3 to 10, and further preferably 4 to 8 from the viewpoint of reducing the water content and achieving ease of production.

The concentration of the mesoporous silica particles in terms of $SiO_2$ weight in the thus-obtained mesoporous silica particle-organic solvent dispersion solution in which the mesoporous silica particles are dispersed in the organic solvent is preferably 1 to 20 weight %, more preferably 2 to 15 weight %, and further preferably 5 to 12 weight % from the viewpoint of the ease of producing the paint composition described later and the preservation stability of the dispersion solution. Herein, the concentration in terms of $SiO_2$ weight refers to the weight ratio of $SiO_2$ contained in the mesoporous silica particles, assuming that the weight of the mesoporous silica particle-organic solvent dispersion solution is 100 weight %.

The mesoporous silica particles in the mesoporous silica particle-organic solvent dispersion solution are dried, resulting in the hollow mesoporous silica particles in which the organic solvent or the like in the pores and inside the outer shell portion is removed and is replaced by gas such as air. The weight ratio between the organic component and $SiO_2$ (weight of organic component/weight of $SiO_2$) in the hollow mesoporous silica particles is preferably 0 to 0.5 from the viewpoint of reducing the refractive index and reflectance of the coating film. The weight ratio (weight of organic component/weight of $SiO_2$) is more preferably 0.1 to 0.4 and further preferably 0.2 to 0.3 from the viewpoint of achieving both a lower refractive index and a lower reflectance of the coating film described later and the dispersibility of the mesoporous silica particles in the paint composition described later as well as the viewpoint of suppressing a decrease in film strength caused by a high content of the organic component.

As described above, in the process (III), the dispersion solution containing the composite silica particles (composite silica particle-containing dispersion solution) obtained in the process (II) is brought into contact with the cation exchange resin, thereby removing the surfactant and the emulsion droplets from the composite silica particles. Then, the dispersion solution is diluted with the organic solvent and concentrated in this order, thereby obtaining the organic solvent dispersion solution containing the mesoporous silica particles (mesoporous silica particle-organic solvent dispersion solution).

[Hollow Mesoporous Silica Particles]

Next, a description will be given of the hollow mesoporous silica particles among the mesoporous silica particles to be obtained by the production method of the present invention.

The hollow mesoporous silica particles of the present invention are obtained in the following manner. The silica source is added to the emulsion that is obtained by pressurizing the mixed solution containing the hydrophobic organic compound, the surfactant, and the aqueous solvent by a high-pressure emulsification method and in which the emulsion droplets containing the hydrophobic organic compound are dispersed, followed by stirring. Then, the composite silica particles including the silica-containing outer shell portion with the mesoporous structure and the emulsion droplets embedded inside the outer shell portion are precipitated, and the emulsion droplets are removed from the composite silica particles.

According to the production method of the present invention, it is possible to produce the hollow mesoporous silica particles in which the mesoporous structure of the outer shell portion has an average pore size of preferably 1 to 3 nm, more preferably 1.2 to 3 nm, and further preferably 1.3 to 2.8 nm.

The average pore size of the mesoporous structure can be obtained by the BJH method based on a nitrogen adsorption isotherm obtained by nitrogen adsorption measurement.

According to the production method of the present invention, preferably, the hollow mesoporous silica particles having a uniform mesopore size, and more preferably the hollow mesoporous silica particles in which 70% or more of the mesopores have a pore size in a range of ±30% of the average pore size can be produced. The pore size distribution of the mesopores can be obtained from a differential pore volume within a predetermined range based on a peak top of the pore size obtained by the BJH method.

The structure of the outer shell portion having the mesopore structure can be observed with a transmission electron microscope (TEM). It is possible to observe the pore size, the regularity in the arrangement of the pores, the manner in which the pores penetrate from the outside to the inside of the outer shell portion, and the like.

The regularity in the arrangement of the mesopores in the outer shell portion also can be evaluated from a spectrum to be obtained by a powder X-ray diffraction (XRD). More specifically, when a powder X-ray diffraction spectrum of the hollow mesoporous silica particles obtained by irradiation with a CuKα1 ray ($\lambda=0.154050$ nm) exhibits at least one peak having a peak top in a region of a diffraction angle (2θ) corresponding to a crystal lattice spacing (d) in a range of 2 to 6 nm, it can be evaluated that the mesopores in the outer shell portion are arranged with high regularity.

According to the production method of the present invention, it is possible to produce the hollow mesoporous silica particles having a BET specific surface area of preferably 500 to 1500 $m^2/g$, more preferably 600 to 1400 $m^2/g$, and further preferably 650 to 1300 $m^2/g$.

According to the production method of the present invention, it is possible to produce the hollow mesoporous silica particles having an average primary size of preferably 0.005 to 0.2 μm, more preferably 0.008 to 0.15 μm, further preferably 0.010 to 0.12 μm, and particularly preferably 0.040 to 0.10 μm. Further, according to the production method of the present invention, the percentage of the number of coarse particles having a particle size of more than 0.2 μm is 10% or less, preferably 8% or less, and more preferably 5% or less of the number of the whole hollow mesoporous silica particles.

According to the production method of the present invention, it is possible to produce the hollow mesoporous silica particles in which the hollow portion has an average diameter of preferably 0.004 to 0.15 μm, more preferably 0.005 to 0.1 μm, further preferably 0.01 to 0.08 μm, and particularly preferably 0.02 to 0.06 μm.

According to the production method of the present invention, preferably 80% or more, more preferably 82% or more, and further preferably 85% or more of the whole hollow mesoporous silica particles obtained by the production method of the present invention have a particle size in a range of ±30% of the average primary particle size. Thus, according to the production method of the present invention, it is possible to produce the hollow mesoporous silica particles composed of particles having a highly uniform particle size. Further, according to the production method of the present invention, preferably 75% or more and more preferably 80% or more of the hollow mesoporous silica particles obtained by the production method of the present invention have a pore size in a range of ±30% of the average pore size.

The average primary particle size of the hollow mesoporous silica particles can be adjusted based on the pressure to be applied to the mixed solution containing the hydrophobic organic compound, the surfactant, and the aqueous solvent during the high-pressure emulsification, the selection of the surfactant or the hydrophobic organic compound, the stirring power for the mixing, the concentration of the raw material, the temperature of the solution, and the like. For example, in the case of forming the hollow mesoporous silica particles having an average primary particle size of 0.005 to 0.2 μm, the average primary particle size can be adjusted mainly based on the pressure to be applied to the mixed solution during the high-pressure emulsification.

According to the production method of the present invention, it is possible to produce the hollow mesoporous silica particles in which the outer shell portion has an average thickness of preferably 3 to 30 nm, more preferably 5 to 20 nm, and further preferably 5 to 15 nm.

Herein, the average primary particle size and the extent of the particle size distribution of the hollow mesoporous silica particles, the abundance ratio (%) of particles having a particle size of more than 0.2 nm, the average diameter of the hollow portion (average hollow portion diameter), and the average thickness of the outer shell portion (average outer shell portion thickness) are expressed as values obtained through the observation with a transmission electron microscope (TEM). More specifically, the observation is performed on the whole particles in a field of view including 20 to 30 hollow mesoporous silica particles so as to measure the diameter of the particles, the diameter of the hollow portion, and the thickness of the outer shell portion based on a photograph with a transmission electron microscope. This operation is performed with respect to 5 different fields of view. Based on the obtained data, the number average primary particle size and the extent of the particle size distribution, the abundance ratio (%) of particles having a particle size of more than 0.2 nm, the number average diameter of the hollow portion, and the number average thickness of the outer shell portion are obtained. The magnification of the transmission electron microscope is 10000 to 100000 times as a guide, and is adjusted appropriately according to the size of the silica particles. The measurement requires the data on at least 100 or more hollow mesoporous silica particles.

[Paint Composition]

The paint composition of the present invention contains a matrix forming material and the mesoporous silica particles. The paint composition of the present invention is obtained by, for example, any of the following preparation methods (1) to (3).

(1) After removing the surfactant and the emulsion droplets from the composite silica particles by bringing the composite silica particle-containing dispersion solution into contact with the cation exchange resin, the dispersion solution is diluted with the organic solvent and concentrated in this order, resulting in the mesoporous silica particle-organic solvent dispersion solution. The mesoporous silica particle-organic solvent dispersion solution, the matrix forming material, and, according to need, the organic solvent are mixed.

(2) The composite silica particles are dried and then calcined, resulting in the hollow mesoporous silica particles. The hollow mesoporous silica particles, the matrix forming material, and the organic solvent are mixed.

(3) The mesoporous silica particles separated from the mesoporous silica particle-organic solvent dispersion solution are dried and have the organic solvent filled in the pores and inside the outer shell portion removed, resulting in the hollow mesoporous silica particles. The hollow mesoporous silica particles, the matrix forming material, and the organic solvent are mixed.

According to the preparation method (1), the mesoporous silica particles and the precursor thereof (composite silica particles) are not taken out of the solution during the production of the paint composition. Thus, it is possible to provide the paint composition in which the mesoporous silica particles are well dispersed.

According to the preparation method (2), the composite silica particles are calcined during the production of the paint composition. This allows the mesoporous silica particles to have a high strength because the organic component is removed by the calcination. Thus, it is possible to form the coating film having a low refractive index and a high strength.

The hollow portion inside the outer shell portion and the pores of the mesoporous silica particles in the paint composition to be obtained by the preparation method (1) are filled with the organic solvent used for diluting the mesoporous silica particle aqueous dispersion solution. In addition, a small amount of the surfactant and/or the hydrophobic organic compound used for the preparation of the paint composition may be present.

The average primary particle size of the mesoporous silica particles contained in the paint composition of the present invention is required to be 10 to 200 nm from the viewpoint of ensuring the preservation stability of the paint composition and achieving a lower refractive index and high transparency of the coating film, and is preferably 30 to 100 nm and more preferably 40 to 80 nm from the same viewpoint. The "average primary particle size" of the mesoporous silica particles is measured under conditions shown in detail in the examples, and is equivalent to that of the hollow mesoporous silica particles having the same structure except that air is present in the hollow portion and the pores.

The mesoporous silica particles contained in the paint composition of the present invention have an average pore size of preferably 1.0 to 2.5 nm, more preferably 1.0 to 2.3 nm, and further preferably 1.0 to 2.2 nm from the viewpoint of reducing the refractive index and reflectance of the coating film. When the average pore size is 1.0 nm or more, the mesoporous silica particles have a high porosity, which allows the coating film to have a lower refractive index and a lower reflectance. Further, when the average pore size is 2.5 nm or less, the matrix forming material in the paint composition is less likely to enter into the mesopores of the mesoporous silica particles, which allows the coating film to have a lower refractive index and a lower reflectance. The "average pore size" of the mesoporous silica particles is measured under conditions shown in detail in the examples, and is equivalent to that of the hollow mesoporous silica particles having the same structure except that air is present in the hollow portion and the pores.

The outer shell portion of the mesoporous silica particles contained in the paint composition of the present invention has an average inner diameter (average hollow portion diameter) of preferably 5 to 150 nm, more preferably 10 to 100 nm, and further preferably 30 to 60 nm from the viewpoint of reducing the refractive index and reflectance of the coating film. The "average inner diameter of the outer shell portion (average hollow portion diameter)" of the mesoporous silica particles is measured under conditions shown in detail in the examples, and is equivalent to that of the hollow mesoporous silica particles having the same structure except that air is present in the hollow portion and the pores.

The mesoporous silica particles contained in the paint composition of the present invention have an average outer shell portion thickness of preferably 3 to 50 nm, more preferably 5 to 20 nm, and further preferably 5 to 10 nm from the viewpoint of achieving both a reduction in the refractive index and reflectance of the coating film and an improvement in the strength of the coating film. The "average outer shell portion thickness" of the mesoporous silica particles is measured under conditions shown in detail in the examples, and is equivalent to that of the hollow mesoporous silica particles having the same structure except that air is present in the hollow portion and the pores.

The hollow mesoporous silica particles that are obtained by removing the organic solvent or the like filled in the pores and inside the outer shell portion of the mesoporous silica particles contained in the paint composition of the present invention have a total porosity of preferably 50% to 80%, more preferably 60% to 80%, and further preferably 65% to 80% from the viewpoint of achieving both a reduction in the refractive index and reflectance of the coating film and an improvement in the strength of the coating film. The total porosity of the hollow mesoporous silica particles can be calculated from the porosity of the outer shell portion and the porosity of the hollow portion. From the viewpoint of achieving both a reduction in the refractive index and reflectance of the coating film and an improvement in the strength of the coating film, the porosity of the outer shell portion is preferably 10% to 60% and more preferably 15% to 50%, and the porosity of the hollow portion is preferably 20% to 80% and more preferably 40% to 70%.

The concentration of the mesoporous silica particles contained in the paint composition of the present invention is preferably 0.2 to 40 weight %, more preferably 0.2 to 10 weight %, and further preferably 0.2 to 1 weight % in terms of $SiO_2$ weight from the viewpoint of improving the preservation stability of the paint composition and reducing the refractive index and reflectance of the coating film. Herein, the concentration in terms of $SiO_2$ weight refers to the weight ratio of $SiO_2$ contained in the mesoporous silica particles in the paint composition, assuming that the weight of the paint composition is 100 weight %.

[Matrix Forming Material]

Examples of the matrix forming material to be contained in the paint composition of the present invention include materials that have transparency with respect to visible light, such as a silane compound and a fluorine group-containing resin.

Examples of the silane compound include multifunctional alkoxysilanes such as tetraalkoxysilanes, trialkoxysilanes, and dialkoxysilanes. The silane compounds can be used alone or in combination of two or more. Examples of the silane compound further include partial condensation products thereof, such as a methylsilicate oligomer and an ethylsilicate oligomer.

Examples of the tetraalkoxysilanes include tetramethoxysilane, tetraethoxysilane, and the like.

Examples of the trialkoxysilanes include methyltrimethoxysilane, methyltriethoxysilane, ethyltrimethoxysilane, ethyltriethoxysilane, cyclohexyltrimethoxysilane, cyclohexyltriethoxysilane, n-propyltrimethoxysilane, n-propyltriethoxysilane, i-propyltrimethoxysilane, i-propyltriethoxysilane, n-pentyltrimethoxysilane, n-hexyltrimethoxysilane, n-heptyltrimethoxysilane, n-octyltrimethoxysilane, n-butyltrimethoxysilane, n-butyltriethoxysilane, 3-glycidoxypropyltrimethoxysilane, 3-glycidoxypropyltriethoxysilane, β-(3,4-epoxycyclohexyDethyltrimethoxysilane, (3,4-epoxycyclohexyl)methyltriethoxysilane, 3-mercaptopropyltrimethoxysilane, 3-mercaptopropyltriethoxysilane, 3-aminopropyltrimethoxysilane, 3-aminopropyltriethoxysilane, 3,3,3-trifluoropropyltrimethoxysilane, 3,3,3-trifluoropropyltriethoxysilane, methacryloxypropyltrimethoxysilane, methacryloxypropyltriethoxysilane, and the like.

Examples of the dialkoxysilanes include dimethyldimethoxysilane, dimethyldiethoxysilane, diethyldimethoxysilane, diethyldiethoxysilane, 3-glycidoxypropylmethyldimethoxysilane, 3-glycidoxypropylmethyldiethoxysilane, 3,3,3-trifluoropropylmethyldimethoxysilane, 3,3,3-trifluoropropylmethyldiethoxysilane, and the like.

As the fluorine group-containing resin, a fluorine group-containing polymer that contains a long-chain fluoroalkyl group or the like can be used. Examples of a monomer for forming the fluorine group-containing polymer include fluoroolefins, alkyl perfluoro vinyl ethers, alkoxyalkyl perfluoro vinyl ethers, perfluoro(alkyl vinyl ethers), perfluoro(alkoxyalkyl vinyl ethers), and the like. Examples of the fluoroolefins include tetrafluoroethylene, hexafluoropropylene, 3,3,3-trifluoropropylene, and the like. Examples of the perfluoro(alkyl vinyl ethers) include perfluoro(methyl vinyl ether), perfluoro (ethyl vinyl ether), perfluoro(propyl vinyl ether), perfluoro (butyl vinyl ether), perfluoro(isobutyl vinyl ether), and the like. Examples of the perfluoro(alkoxyalkyl vinyl ethers) include perfluoro(propoxypropyl vinyl ether) and the like. One or two or more of these monomers can be used, and the monomers can be copolymerized with another monomer.

Among the above-described matrix forming materials, a silane compound is preferable, a methylsilicate oligomer and an ethylsilicate oligomer are more preferable, and a methylsilicate oligomer is particularly preferable, from the viewpoint of achieving both a reduction in the refractive index and reflectance of the coating film and an improvement in the strength of the coating film as well as the viewpoint of cost reduction and ease of production.

The solid content concentration of the matrix forming material contained in the paint composition of the present invention is preferably 0.1 to 60 weight %, more preferably 0.2 to 10 weight %, and further preferably 0.3 to 1 weight % from the viewpoint of improving the preservation stability of the paint composition and reducing the refractive index and reflectance of the coating film.

Assuming that the sum of the solid content weight of the matrix forming material and the weight of $SiO_2$ in the mesoporous silica particles is 100 weight %, the solid content concentration of the matrix forming material is preferably 20 to 90 weight % and more preferably 50 to 80 weight % from the viewpoint of reducing the refractive index and reflectance of the coating film. In other words, the weight ratio (weight of $SiO_2$ in mesoporous silica particles/solid content weight of matrix forming material) is preferably 80/20 to 10/90 and more preferably 50/50 to 20/80.

[Organic Solvent]

The organic solvent to be contained in the paint composition of the present invention is not limited particularly as long as it can be volatilized easily by the application of heat. For example, the [Organic solvent] for use in the dilution-concentration process in the process (III) in the method for producing the mesoporous silica particles can be used.

From the viewpoint of economical efficiency, the paint composition of the present invention usually is produced as a concentrate, which is diluted in use in many cases. The paint composition of the present invention may be used as it is, or alternatively, the paint composition in the form of a concentrate may be diluted with the organic solvent, for example, before use. In the case of diluting the concentrate, the dilution ratio is not limited particularly, and can be determined appropriately according to the concentration of each component in the concentrate (such as the content of the mesoporous silica particles), the method of application, or the like.

[Method for Forming Coating Film]

A support to which the paint composition of the present invention is to be applied is not limited particularly, and may be a conventionally known translucent film or the like made of polycarbonate, polyphenylene sulfide, polysulfone, polypropylene, polymethyl methacrylate, polyvinyl alcohol, polyethylene terephthalate, polyethylene naphthalate, polyamide, polyaramid, polyimide, cellulose triacetate, cycloolefin polymer, or the like. Also, an inorganic transparent substrate or the like made of glass, quartz, ITO, or the like may be used.

The thickness of the support is not limited particularly and varies depending on its application, and is preferably 50 to 500 µm in general.

A surface of the support to which the paint composition is to be applied may be subjected to a surface treatment such as a corona treatment and a plasma treatment.

Examples of a method of applying the paint composition include a spin coating method, a roll coating method, a curtain coating method, a slide coating method, a die coating method, a blade coating method, a bar coating method, a flow coating method, a spray coating method, and the like.

The application rate may be selected appropriately according to the method of applying the paint composition, the viscosity of the paint composition, or the like.

A paint layer formed by applying the paint composition to the support is dried at a predetermined drying temperature for a predetermined period of time, resulting in a coating film. In the case where the organic solvent is filled in the pores and inside the outer shell portion of the mesoporous silica particles in the paint composition, the organic solvent filled in the pores and inside the outer shell portion of the mesoporous silica particles in the paint layer is removed by volatilization, so that the mesoporous silica particles turn into the hollow mesoporous silica particles, and the matrix forming material turns into a matrix. In the case where the matrix forming material is a methylsilicate oligomer, for example, the matrix is made of silica ($SiO_2$). The drying temperature is preferably 50° C. to 200° C. and more preferably 100° C. to 150° C. The drying time is preferably 1 to 600 minutes and more preferably 2 to 10 minutes. In the case where the hydrophobic organic compound remains in the mesoporous silica particles in the paint composition, it is inferred that the hydrophobic organic compound is removed by evaporation during the process of drying the paint layer.

[Coating Film]

Next, the coating film of the present invention will be described.

The coating film of the present invention contains the matrix and the hollow mesoporous silica particles dispersed in the matrix. The hollow mesoporous silica particles have the silica-containing outer shell portion with the mesoporous structure and the hollow portion present on an inner side relative to the outer shell portion. The hollow mesoporous silica particles have an average primary particle size of preferably 10 to 200 nm.

The coating film of the present invention is formed using the paint composition of the present invention that contains the mesoporous silica particles having an average primary particle size of 10 to 200 nm, for example. Thus, the coating film can have a film thickness of preferably 10 to 300 nm, more preferably 50 to 200 nm, and further preferably 70 to 150 nm. Consequently, the coating film of the present invention is suitable as an antireflection film. The "film thickness" is measured under conditions shown in detail in the examples.

The coating film of the present invention contains the hollow mesoporous silica particles having an average pore size of 1.0 to 2.5 nm, an average primary particle size of 10 to 200 nm, and a total porosity of 50% to 80%, for example. Thus, by selecting the content of the hollow mesoporous silica particles in the coating film, the type of the matrix forming material, and the like, the coating film of the present invention can have the refractive index, the minimum reflectance, the total light transmittance, and the haze value as described below.

The refractive index of the coating film of the present invention is preferably 1.10 to 1.40, more preferably 1.20 to 1.36, and further preferably 1.22 to 1.30 from the viewpoint of improving the antireflection performance of the coating film. The "refractive index" is measured under conditions shown in detail in the examples.

The minimum reflectance of the coating film of the present invention is preferably 0% to 2%, more preferably 0% to 1%, and further preferably 0% to 0.8% from the viewpoint of improving the antireflection performance of the coating film. The "minimum reflectance" is measured under conditions shown in detail in the examples.

The total light transmittance of the coating film of the present invention is preferably 90% to 100%, more preferably 93% to 100%, and further preferably 95% to 100% from the viewpoint of improving the antireflection performance of the coating film. The "total light transmittance" is measured under conditions shown in detail in the examples.

The haze value of the coating film of the present invention is preferably 0% to 10%, more preferably 0% to 3%, and further preferably 0% to 1% from the viewpoint of improving the antireflection performance of the coating film. The "haze value" is measured under conditions shown in detail in the examples.

EXAMPLES

Hereinafter, an example of the present invention will be described by way of examples. In the examples and comparative examples described below, various measurements of the hollow mesoporous silica particles were performed in the following manners.

(1) Measurement of Average Primary Particle Size, Average Hollow Portion Diameter (Average Inner Diameter of Outer Shell Portion), and Average Outer Shell Portion Thickness The hollow mesoporous silica particles were observed at an acceleration voltage of 160 kV with a transmission electron microscope (TEM) (manufactured by JEOL Ltd., trade name: JEM-2100). The observation was performed on the whole particles in five fields of view, each including 20 to 30 hollow mesoporous silica particles, so as to measure the diameter of the particles, the hollow portion diameter, and the outer shell portion thickness based on a photograph, followed by obtaining the number average primary particle size, the number average hollow portion diameter, and the number average outer shell portion thickness. The observation of the hollow mesoporous silica particles was performed using a Cu mesh with a high-resolution carbon support film (manufactured by Okenshoji Co., Ltd., 200-A mesh) to which a sample is adhered with a surplus of the sample removed by blowing.

(2) Measurement of BET Specific Surface Area and Average Pore Size

With a specific surface area-pore distribution measurement apparatus (manufactured by Shimadzu Corporation, trade name: ASAP 2020), the BET specific surface area of the hollow mesoporous silica particles was measured by a multipoint method using liquid nitrogen, and a value was derived within a range in which the parameter C was positive. The pore size distribution was derived using the BJH method, and a peak top was determined as the average pore size. The porosity of the outer shell portion was calculated by the t-plot method. Samples in Examples 1 to 5 and Comparative Example 1 were pretreated by the application of heat at 250° C. for 5 hours, and samples in Production Examples 1 and 2 and Comparative Example 2 were pretreated by the application of heat at 120° C. for 2 hours.

(3) Measurement of Powder X-Ray Diffraction (XRD) Pattern

Powder X-ray diffractometry was carried out with a powder X-ray diffractometer (manufactured by Rigaku Corporation, trade name: RINT2500VPC). A continuous scanning method was used, in which the scanning range was a diffraction angle (2θ) of 1° to 20° and the scanning rate was 4.0°/minute. The sample was pulverized and then crammed on an aluminum plate, followed by measurement.

X ray source: Cu-kα
Tube voltage: 40 mA
Tube current: 40 kV
Sampling interval: 0.02°
Divergence slit: ½°
Longitudinal divergence slit: 1.2 mm
Scattering slit: ½°
Receiving slit: 0.15 mm (4) Abundance Ratio (%) of Particles Having Particle Size of More than 0.2 μm Using the results of measuring the particle size of the particles in the five fields of view in the "(1) Measurement of average primary particle size, average hollow portion diameter (average inner diameter of outer shell portion), and average outer shell portion thickness" above, the abundance ratio was obtained from the following formula.

Abundance ratio (%)=number of particles having particle size of more than 0.2 μm/number of whole particles in five fields of view×100

(5) Ratio (%) of Particles Having Particle Size of ±30% of Average Primary Particle Size Using the particle size and the average primary particle size of the whole particles in the five fields of view measured in the "(1) Measurement of average primary particle size, average hollow portion diameter (average inner diameter of outer shell portion), and average outer shell portion thickness" above, the ratio was calculated.

(6) Porosity

Assuming that each of the hollow mesoporous silica particles and the hollow portion thereof was a sphere, the volume average primary particle size and the volume average hollow portion diameter were calculated from the number average primary particle size and the number average hollow portion diameter obtained in (1) above, and the porosity derived from the hollow portion of the hollow mesoporous silica particles was calculated from the volume average primary particle size and the volume average hollow portion diameter. Then, the total porosity of the hollow mesoporous silica particles was calculated using the porosity of the outer shell portion and the porosity of the hollow portion.

(7) Quantification of Organic Component

The organic component contained in the hollow mesoporous silica particles was measured with a differential thermal balance (TG-DTA) (manufactured by Rigaku Corporation, trade name: Thermo Plus TG8120). Under an air flow (300 mL/min), the temperature was raised from 25° C. to 700° C. at a rate of 10° C./min. A residual weight measured at a temperature of 700° C. was regarded as the weight of $SiO_2$, while a loss weight during the application of heat from 200° C. to 700° C. was regarded as the weight of the organic component, whereby the weight ratio therebetween (weight of organic component/weight of $SiO_2$) was obtained.

Example 1

1 g of dodecane (manufactured by Kanto Chemical Co., Ltd.) was added to an aqueous solution obtained by dissolving 2 g of dodecyltrimethylammonium chloride (manufactured by Tokyo Kasei Kogyo Co., Ltd.) and 0.83 g of a 25% tetramethyl ammonium hydroxide aqueous solution (manufactured by Kanto Chemical Co., Ltd.) in 400 g of water, followed by stirring, thereby obtaining a mixed solution (pH: 11.0). A pencil mixer was used as an agitator, and the stirring was performed for 5 minutes. In the mixed solution, the concentration of dodecyltrimethylammonium chloride was 19 mM/L, and the concentration of dodecane was 15 mM/L.

The thus obtained mixed solution was supplied to a high-pressure emulsifier (Microfluidizer M-110EHi, manufactured by Microfluidics Corporation) mounted with a Y-shaped chamber having a flow path diameter of 75 μm (manufactured by Microfluidics Corporation), so that the mixed solution was subjected to an emulsification treatment once by the application of a pressure of 150 MPa thereto.

A resultant emulsion was adjusted at a temperature of 25° C. and a pH of 11.0, and 1 g of tetramethoxysilane (manufactured by Tokyo Kasei Kogyo Co., Ltd.) was added thereto as a silica source, followed by stirring with a magnetic stirrer for 5 hours. A resultant precipitate was separated from the dispersion solution by filtration and dried in an atmosphere of 100° C. overnight, resulting in composite silica particles. Then, the composite silica particles were calcined at 600° C. for 2 hours, resulting in hollow mesoporous silica particles. The amount of tetramethoxysilane added was 0.2 weight % as a concentration in terms of $SiO_2$ weight in the composite silica particle-containing dispersion solution.

Figure 1:
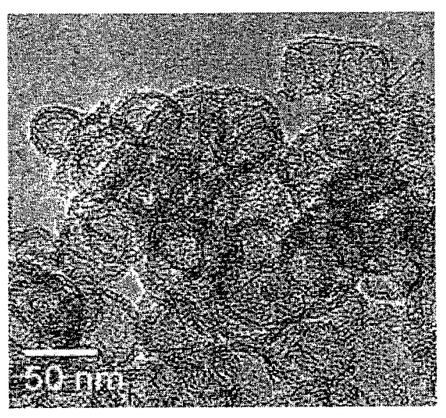
FIG. 1 is a TEM image of hollow mesoporous silica particles obtained in Example 1.

FIG. 1 shows a TEM image of the hollow mesoporous silica particles obtained in Example 1.

Example 2

The same treatment was performed as in Example 1 except that 3 g, instead of 2 g, of dodecyltrimethylammonium chloride was added, resulting in hollow mesoporous silica particles. The concentration of dodecyltrimethylammonium chloride in the mixed solution was 28 mM/L.

Example 3

The same treatment was performed as in Example 1 except that 4 g, instead of 2 g, of dodecyltrimethylammonium chloride was added, resulting in hollow mesoporous silica particles. The concentration of dodecyltrimethylammonium chloride in the mixed solution was 38 mM/L.

Example 4

The same treatment was performed as in Example 1 except that a pressure of 100 MPa, instead of 150 MPa, was applied to the mixed solution for the high-pressure emulsification, resulting in hollow mesoporous silica particles.

Example 5

The same treatment was performed as in Example 1 except that a pressure of 50 MPa, instead of 150 MPa, was applied to the mixed solution for the high-pressure emulsification, resulting in hollow mesoporous silica particles.

Comparative Example 1

The same treatment was performed as in Example 1 except that the mixed solution was emulsified with a homogenizer instead of the high-pressure emulsifier, resulting in hollow mesoporous silica particles.

TABLE 1

| | Ex. 1 | Ex. 2 | Ex. 3 | Ex. 4 | Ex. 5 | Com. Ex. 1 |
|---|---|---|---|---|---|---|
| Average pore size (nm) | 2.1 | 2.2 | 2.1 | 2.1 | 2.1 | 1.6 |
| Average primary particle size (μm) | 0.065 | 0.052 | 0.062 | 0.063 | 0.05 | 0.8 |
| Ratio (%) of particles having particle size of ±30% of average primary particle size | 95[1] | 90 | 85 | 90 | 85 | 80 |
| Average diameter of hollow portion (average hollow portion diameter) (μm) | 0.055 | 0.042 | 0.051 | 0.052 | 0.04 | 0.65 |
| Crystal lattice spacing (d) (nm) observed by XRD | 4.3 | 4.3 | 4.3 | 4.3 | 4.3 | 3.3 |
| BET specific surface area (m$^2$/g) | 1250 | 1180 | 1235 | 943 | 900 | 1000 |
| Total porosity (%) | 80 | 76 | 78 | 78 | 76 | 77 |
| Abundance ratio (number %) of particles having particle size of more than 0.2 μm | 0 | 0 | 0 | 0 | 0 | 100 |

[1]Taking Example 1 as an example, 95% of the whole particles in the five fields of view have a particle size in a range of ±30% of the average particle size. The same applies to Example 2 to Comparative Example 1.

From Table 1, it was confirmed that the hollow mesoporous silica particles in Examples 1 to 5 in which a high-pressure emulsification method was used to form the emulsion droplets in the production process have a smaller average primary particle size, include a lower proportion of particles having an average primary particle size of larger than 0.2 μm, and have a narrower particle size distribution than the hollow mesoporous silica particles in Comparative Example 1 in which a homogenizer was used to form the emulsion droplets in the production process. Further, it was confirmed from the average pore size and the crystal lattice spacing (d) that the average pore size and the regularity in the arrangement of the mesopores of the hollow mesoporous silica particles in Examples 1 to 5 were at the same level as those of the hollow mesoporous silica particles in Comparative Example 1.

Production Example 1

1 g of dodecane (manufactured by Kanto Chemical Co., Ltd.) was added to an aqueous solution obtained by dissolving 4 g of dodecyltrimethylammonium chloride (manufactured by Tokyo Kasei Kogyo Co., Ltd.) and 0.83 g of a 25% tetramethyl ammonium hydroxide aqueous solution (manufactured by Kanto Chemical Co., Ltd.) in 400 g of water, followed by stirring, thereby obtaining a mixed solution (pH: 11.5). A pencil mixer was used as an agitator, and the stirring was performed for 5 minutes. In the mixed solution, the concentration of dodecyltrimethylammonium chloride was 38 mM/L, and the concentration of dodecane was 15 mM/L.

The thus obtained mixed solution was supplied to a high pressure emulsifier (Microfluidizer M-110EHi, manufactured by Microfluidics Corporation) mounted with a Y-shaped chamber having a flow path diameter of 75 μm (manufactured by Microfluidics Corporation), so that the mixed solution was subjected to an emulsification treatment once by the application of a pressure of 150 MPa thereto.

250 g of a resultant emulsion was adjusted at 20° C., and 1 g of tetramethoxysilane (manufactured by Tokyo Kasei Kogyo Co., Ltd.) was added thereto as a silica source, followed by stirring with a magnetic stirrer for 5 hours, resulting in a composite silica particle-containing dispersion solution. The amount of tetramethoxysilane added was 0.2 weight % as a concentration in terms of $SiO_2$ weight in the composite silica particle-containing dispersion solution.

A hexamethyldisiloxane-containing solution obtained by stirring 0.32 g of water, 0.46 g of concentrated hydrochloric acid (manufactured by Waco Pure Chemical Industries Ltd.), 0.60 g of 2-propanol (hereinafter, referred to as "IPA", manufactured by Waco Pure Chemical Industries Ltd.), and 0.40 g of hexamethyldisiloxane (manufactured by Waco Pure Chemical Industries Ltd.) at 20° C. for 1 hour was mixed with 200 g of the composite silica particle-containing dispersion solution by stirring at 20° C. for 24 hours (pH after the stirring and mixing: 2.0).

20 g of a strongly acidic cation exchange resin (Amberlite 120B (H), manufactured by ORGANO CORPORATION) was added to 202 g of a mixed solution obtained by mixing the hexamethyldisiloxane-containing solution and the composite silica particle-containing dispersion solution, followed by stirring at 20° C. for 5 hours. After stopping the stirring, the cation exchange resin was removed by decantation, resulting in a mesoporous silica particle aqueous dispersion solution.

The mesoporous silica particle aqueous dispersion solution was diluted 2-fold with IPA, followed by 2-fold concentration by evaporation (50° C.). This IPA dilution-concentration process was repeated 7 times, resulting in a mesoporous silica particle-IPA dispersion solution (Karl Fischer moisture: 0.16 wt %). The mesoporous silica particle-IPA dispersion solution further was concentrated by evaporation, resulting in a mesoporous silica particle-IPA dispersion solution having a concentration in terms of $SiO_2$ weight of 8.7 weight %.

Hollow mesoporous silica particles obtained by drying the mesoporous silica particle-IPA dispersion solution at 100° C. for one day were subjected to XRD measurement. As a result, a XRD peak (spacing d: 4.3 nm) derived from the mesoporous structure was confirmed. By a TEM observation, it was confirmed that the average primary particle size was 63 nm, the average hollow portion diameter was 47 nm, and the average outer shell portion thickness was 8 nm and that the outer shell portion had the mesopores. The BET specific surface area was 870 $m^2$/g, and the average pore size was 2.2 nm. As a result of a TG-DTA analysis, the weight ratio (weight of organic component/weight of $SiO_2$) in the hollow mesoporous silica particles was 0.30. In the hollow mesoporous silica particles, the hollow portion had a porosity of 62%, and the outer shell portion had a porosity of 21%, resulting in a total porosity of 70%.

Production Example 2

The same treatment was performed as in Production Example 1 except that the hexamethyldisiloxane-containing solution and the composite silica-containing dispersion solution were not allowed to react with each other, resulting in a mesoporous silica particle-IPA dispersion solution having a concentration in terms of $SiO_2$ weight of 10 weight %.

Hollow mesoporous silica particles obtained by drying the mesoporous silica particle-IPA dispersion solution at 100° C. for one day were subjected to XRD measurement. As a result, a XRD peak (spacing d: 4.4 nm) derived from the mesoporous structure was confirmed. By a TEM observation, it was confirmed that the average primary particle size was 50 nm, the average hollow portion diameter was 37 nm, and the average outer shell portion thickness was 6 nm and that the outer shell portion had the mesopores. The BET specific surface area was 850 $m^2$/g, and the average pore size was 2.1 nm. As a result of a TG-DTA analysis, the weight ratio (weight of organic component/weight of $SiO_2$) in the hollow mesoporous silica particles was 0.20. In the hollow mesoporous silica particles, the hollow portion had a porosity of 49%, and the outer shell portion had a porosity of 27%, resulting in a total porosity of 63%.

Example 6

A mixed solution of 33.5 parts by weight of a methylsilicate oligomer (trade name: MS-51, manufactured by Tama Chemicals Co., Ltd.) as the matrix forming material, 430 parts by weight of IPA, and 50 parts by weight of a 0.1N nitric acid aqueous solution was stirred at 20° C. for 24 hours. The mixed solution was mixed with 128 parts by weight of the mesoporous silica particle-IPA dispersion solution (concentration in terms of $SiO_2$ weight: 8.7%) in Production Example 1, followed by further dilution with IPA, thereby obtaining a paint composition having a total solid content concentration of 1 weight % and a weight ratio ($SiO_2$ weight of mesoporous silica particles/solid content weight ($SiO_2$ weight) of matrix forming material) of 40/60, with the concentration in terms of $SiO_2$ weight of the mesoporous silica particles being 0.4 weight % and the solid content concentration of the matrix forming material being 0.6 weight %.

The paint composition was spin coated (1000 rpm, 30 seconds) on an acetone-washed slide glass substrate (trade name: S-1111, refractive index: 1.52, manufactured by Matsunami Glass Ind., Ltd.) and a silicon substrate (manufactured by The Nilaco Corporation), respectively, with a spin coater (manufactured by ABLE), followed by drying at 120° C. for 5 minutes, thereby forming a coating film with the hollow mesoporous silica particles dispersed in a silica matrix.

Example 7

The same treatment was performed as in Example 6 except that the mesoporous silica particle-IPA dispersion solution in Production Example 2 was used instead of the mesoporous silica particle-IPA dispersion solution in Production Example 1, resulting in a paint composition and a coating film.

Example 8

The same treatment was performed as in Example 1 except that the mesoporous silica particle-IPA dispersion solution in Production Example 2 was used instead of the mesoporous silica particle-IPA dispersion solution in Production Example 1, the weight ratio ($SiO_2$ weight of mesoporous silica particles/solid content weight ($SiO_2$ weight) of matrix forming material) was 30/70, the concentration in terms of $SiO_2$ weight of the mesoporous silica particles was 0.3 weight %, and the solid content concentration of the matrix forming material was 0.7 weight %, resulting in a paint composition and a coating film.

Example 9

The same treatment was performed as in Example 1 except that the mesoporous silica particle-IPA dispersion solution in Production Example 2 was used instead of the mesoporous silica particle-IPA dispersion solution in Production Example 1, the weight ratio ($SiO_2$ weight of mesoporous silica particles/solid content weight ($SiO_2$ weight) of matrix forming material) was 20/80, the concentration in terms of $SiO_2$ weight of the mesoporous silica particles was 0.2 weight %, and the solid content concentration of the matrix forming material was 0.8 weight %, resulting in a paint composition and a coating film.

Comparative Example 2

The same treatment was performed as in Example 6 except that commercially available silica (Methanol Silica-sol, manufactured by NISSAN CHEMICAL INDUSTRIES, LTD.) was used instead of the mesoporous silica particle-IPA dispersion solution, resulting in a paint composition and a coating film.

It was confirmed by a TEM observation that a silica powder obtained by drying the commercially available silica at 100° C. for one day was composed of spherical particles having an average primary particle size of 20 nm. The silica powder had a BET specific surface area of 250 m²/g, an average pore size of 4.4 nm, and a broad pore size distribution. The silica powder had a total porosity of 25%.

Comparative Example 3

The same treatment was performed as in Example 6 except that the mesoporous silica particle-IPA dispersion solution was not used, resulting in a paint composition and a coating film.

<Method of Evaluating Coating Film>
(Total Light Transmittance, Haze Value)
The total light transmittance and the haze value were measured using an integrating sphere type light transmittance meter (trade name: HR-150, manufactured by MURAKAMI COLOR RESEARCH LABORATORY CO., Ltd.) as defined by JIS K-7105.

(Minimum Reflectance)
With a spectrophotometer (trade name: U-3300, manufactured by Hitachi, Ltd.), the reflection spectrum in a wavelength range of 380 to 780 nm at an incidence angle of 8° was measured in a state where a black cloth was put on a rear surface of the slide glass substrate. A slide glass without the coating film on which a black cloth was put was used as a blank for correction. Thus, the minimum reflectance of the coating film was obtained.

(Refractive Index, Film Thickness)
With an automatic ellipsometer (trade name: DHA-XA/S6, manufactured by Mizojiri Optical Co., Ltd.), the refractive index and the film thickness of the coating film were measured using a He—Ne laser (wavelength: 632.8 nm) as a light source at an incidence angle of 70°. The refractive index and the film thickness of the coating film were calculated, assuming that the silicon substrate had a refractive index of 3.8750 and an absorption coefficient of 0.023, an incident medium (air) had a refractive index of 1 and an absorption coefficient of 0, and the coating film had an absorption coefficient of 0.

As shown in Table 2, the coating films of Examples 6 to 9 that contain the mesoporous silica particles of Production Example 1 or 2 had a lower refractive index and a lower reflectance than the coating film of Comparative Example 2 or 3.

TABLE 2

| | Type of silica particles | Average primary particle size (nm) | Ratio (%) of particles having particle size of ±30% of average primary particle size | Abundance ratio (number %) of particles having particle size of more than 0.2 μm | Average hollow portion diameter (nm) | Average outer shell portion thickness (nm) | Average pore size (nm) | BET specific surface area (m²/g) | Crystal lattice spacing (d) (nm) observed by XRD | Total porosity (%) |
|---|---|---|---|---|---|---|---|---|---|---|
| Ex. 6 | Mesoporous silica particles of Production Example 1 | 63 | 80[1] | 0 | 47 | 8 | 2.2 | 870 | 4.3 | 70 |
| Ex. 7 | Mesoporous silica particles of Production Example 2 | 50 | 80 | 0 | 37 | 6 | 2.1 | 850 | 4.4 | 63 |
| Ex. 8 | Mesoporous silica particles of Production Example 2 | 50 | 80 | 0 | 37 | 6 | 2.1 | 850 | 4.4 | 63 |
| Ex. 9 | Mesoporous silica particles of Production Example 2 | 50 | 80 | 0 | 37 | 6 | 2.1 | 850 | 4.4 | 63 |
| Com. Ex. 2 | Commercially available silica | 20 | 90 | 0 | 0 | — | 4.4 | 250 | — | 25 |
| Com. Ex. 3 | None | — | — | — | — | — | — | — | — | — |

| | SiO₂ weight of silica particles/solid content weight of matrix forming material | Physical properties of coating film on Si substrate | | Physical properties of coating film on glass substrate | | |
|---|---|---|---|---|---|---|
| | | Refractive index | Film thickness (nm) | Total light transmittance (%) | Haze value (%) | Minimum reflectance (%) |
| Ex. 6 | 40/60 | 1.25 | 146 | 95.7 | 0.6 | 0.6 |
| Ex. 7 | 40/60 | 1.25 | 139 | 95.6 | 0.6 | 1.0 |
| Ex. 8 | 30/70 | 1.32 | 95 | 95.2 | 0.8 | 1.5 |
| Ex. 9 | 20/80 | 1.38 | 74 | 94.8 | 0.9 | 1.9 |

TABLE 2-continued

|  |  |  |  |  |  |  |
|---|---|---|---|---|---|---|
| Com. Ex. 2 | 40/60 | 1.44 | 73 | 94.5 | 0.4 | 2.3 |
| Com. Ex. 3 | 0/100 | 1.45 | 70 | 94.5 | 0.4 | 2.4 |

[1)]Taking Example 6 as an example, 80% of the whole particles in the five fields of view have a particle size in a range of ±30% of the average particle size. The same applies to Example 7 to Comparative Example 3.

INDUSTRIAL APPLICABILITY

As described above, according to the production method of the present invention, it is possible to produce easily mesoporous silica particles that have a small average particle size and include fewer coarse particles. Therefore, the present invention is useful in fields that handle a paint composition for an antireflection film and a coating film (optical film such as a film having a low refractive index), for example.

The invention claimed is:

1. A method for producing mesoporous silica particles, the method comprising:
   pressurizing a mixed solution comprising a hydrophobic organic compound, a surfactant, and an aqueous solvent by a high-pressure emulsification method so as to form an emulsion that comprises emulsion droplets comprising the hydrophobic organic compound;
   adding a silica source to the emulsion so as to form a silica-containing outer shell portion with a mesoporous structure on a surface of the emulsion droplets, and precipitating composite silica particles comprising the outer shell portion and the emulsion droplets on an inner side relative to the outer shell portion; and
   removing the emulsion droplets from the composite silica particles to obtain mesoporous silica particles having a silica-containing out shell portion having a mesoporous structure,
   wherein said hydrophobic organic compound is in a liquid state.

2. The method for producing mesoporous silica particles according to claim 1, wherein the mesoporous silica particles have an average pore size of 1 to 3 nm and an average primary particle size of 0.005 to 0.2 μm.

3. The method for producing mesoporous silica particles according to claim 1, wherein the surfactant is at least one quaternary ammonium salt represented by general formulae (1) or (2)

$$[R^1(CH_3)_3N]^+X^- \quad (1)$$

$$[R^1R^2(CH_3)_2N]^+X^- \quad (2)$$

where $R^1$ and $R^2$ each independently represent a linear or branched alkyl group having a carbon number of 4 to 22, and $X^-$ represents a monovalent anion.

4. The method for producing mesoporous silica particles according to claim 1, wherein the silica source yields a silanol compound by hydrolysis.

5. The method for producing mesoporous silica particles according to claim 1, wherein said removing comprises baking the composite silica particles so as to remove the emulsion droplets and the surfactant from the composite silica particles, thereby obtaining hollow mesoporous silica particles with gas filled in a hollow portion present on an inner side relative to the outer shell portion.

6. The method for producing mesoporous silica particles according to claim 5, wherein the hollow portion of the hollow mesoporous silica particles has an average diameter of 0.004 to 0.15 μm.

7. The method for producing mesoporous silica particles according to claim 5, wherein a powder X-ray diffraction spectrum of the hollow mesoporous silica particles obtained by irradiation with a CuKα1 ray (λ=0.154050 nm) exhibits are at least one peak having a peak top in a region of a diffraction angle (2θ) corresponding to a crystal lattice spacing (d) in a range of 2 to 6 nm.

8. The method for producing mesoporous silica particles according to claim 5, wherein the hollow mesoporous silica particles have a BET specific surface area of 500 to 1500 m²/g.

9. The method for producing mesoporous silica particles according to claim 1, wherein said removing comprises contacting a cation exchange resin with a dispersion solution comprising the composite silica particles obtained from said adding so as to remove the surfactant from the composite silica particles, and then diluting the dispersion solution with an organic solvent and concentrating the same in this order so as to remove the emulsion droplets from the composite silica particles, whereby mesoporous silica particles with the organic solvent filled in a hollow portion present on an inner side relative to the outer shell portion are obtained.

10. A method of making a paint composition, comprising:
    (a) preparing mesoporous silica particles having an average primary particle size of 10 to 200 nm by a method according to claim 1; and
    (b) combining said mesoporous silica particles with a matrix forming material.

11. A method of forming a coating film, comprising
    preparing a paint composition by a method according to claim 10; and
    applying said paint composition to a substrate.

12. The method according to claim 11, wherein said paint composition comprises:
    a matrix; and
    hollow mesoporous silica particles that have a silica-containing outer shell portion with a mesoporous structure and a hollow portion present on an inner side relative to the outer shell portion and have an average primary particle size of 10 to 200 nm.

13. The method according to claim 11, wherein said coating film has a film thickness of 10 to 300 nm.

14. The method according to claim 11, wherein said coating film is an antireflection film.

15. The method for producing mesoporous silica particles according to claim 1, wherein said hydrophobic organic compound is at least one selected from the group consisting of a hydrocarbon compound, an ester compound, a fatty acid having a carbon number of 6 to 22, and a silicone oil.

16. The method for producing mesoporous silica particles according to claim 1, wherein said hydrophobic organic compound is in a liquid state within the temperature range of from 0° C. to 100° C.

17. The method for producing mesoporous silica particles according to claim 1, wherein said hydrophobic organic compound is a hydrocarbon compound having a carbon number of 5 to 18.

18. The method for producing mesoporous silica particles according to claim 1, wherein said hydrophobic organic compound is an alkane having a carbon number of 5 to 18 or a cycloalkane having a carbon number of 5 to 18.

19. The method for producing mesoporous silica particles according to claim 2, wherein said mesoporous silica particles have an average primary particle size of 0.040 to 0.2 μm.

20. The method according to claim 10, wherein said mesoporous silica particles have an average pore size of 1.0 to 2.5 nm in the outer shell portion.

* * * * *